UNITED STATES PATENT OFFICE.

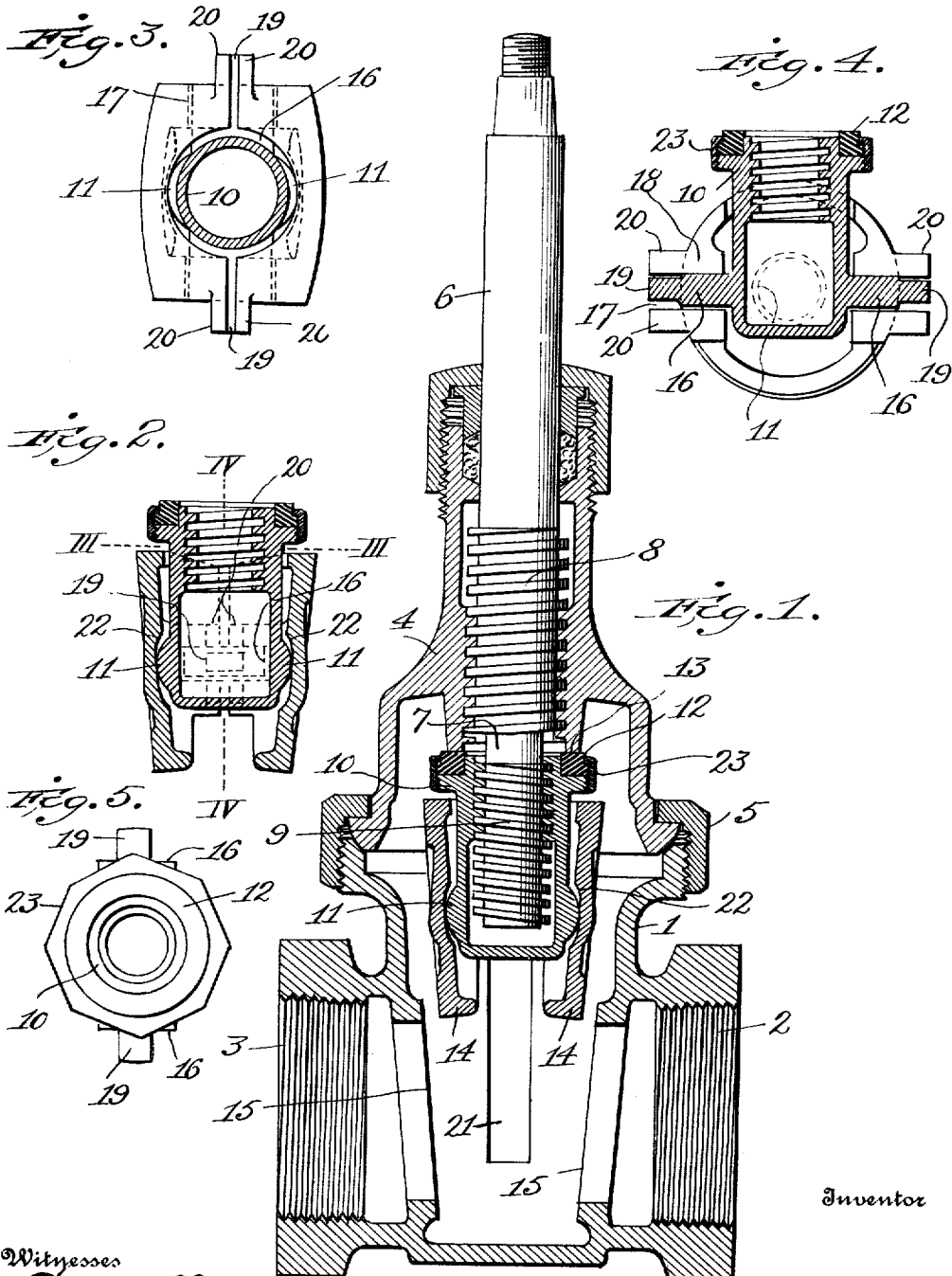

WILLIAM C. MARSH, OF DUNKIRK, NEW YORK, ASSIGNOR TO MARSH VALVE COMPANY, OF DUNKIRK, NEW YORK, A CORPORATION OF NEW YORK.

GATE-VALVE.

1,149,848.

Specification of Letters Patent. Patented Aug. 10, 1915.

Application filed July 27, 1914. Serial No. 853,399.

*To all whom it may concern:*

Be it known that I, WILLIAM C. MARSH, a citizen of the United States, residing at Dunkirk, in the county of Chautauqua and State of New York, have invented certain new and useful Improvements in Gate-Valves, of which the following is a specification.

My invention relates to gate valves, and has for its object to provide certain improvements in the construction and operation of the same as will be hereinafter more definitely pointed out and claimed, reference being had to the accompanying drawing, in which:—

Figure 1 is a central vertical sectional view of my improved gate valve. Fig. 2 is a detail sectional view of the lifting nut and the closing disks or gates. Fig. 3 is a sectional view taken on the line III—III of Fig. 2. Fig. 4 is a vertical view taken on the line IV—IV of Fig. 2. Fig. 5 is a top plan view of the lifting nut detached.

Similar numerals of reference denote corresponding parts in the several views.

In the said drawing, the reference numeral 1 denotes the body of the valve, the same being provided with the internally threaded inlet aperture 2 and outlet aperture 3, in the usual manner. Removably attached to said body 1 is a bonnet piece 4, the same being retained in position on said body by a threaded ring 5, as shown. Passing centrally through the bonnet piece 4 is the valve stem 6 suitably shaped at its upper end to receive an operating handle, not shown, and reduced in size at its lower end at 7, said valve stem having oppositely pitched screw threads 8 and 9, the screw thread 9 being disposed upon the portion 7 thereof as shown.

Mounted upon the screw threaded portion 9 of the valve stem 6 is a lifting nut 10, the same being internally screw threaded to fit said screw threads 9 and being closed at its lower end as shown. Said lifting nut has formed upon opposite sides thereof the rounded projections 11 for a purpose hereinafter to be described. At its upper end said lifting nut is recessed to receive an annular packing 12, which, when said nut is in its uppermost position, is adapted to contact with an annular seat 13 formed in the bonnet piece 4. Disposed upon opposite sides of the lifting nut 10 are the two closing disks or gates 14 adapted when in their lowermost position to seat against and close the valve seats 15 in the valve body. The lifting nut 10 has formed on its sides near its lower end oppositely projecting lugs 16, the same when the parts are assembled being disposed in recesses 17 formed in the backs of the gates 14 in abutments 18 formed thereon, said lugs 16 at their outer ends being reduced at 19 and lying between upper and lower projections 20 formed on said abutments, as clearly shown in Figs. 3 and 4. Said projections 19 and 20, when the parts are assembled, are disposed to move vertically in grooves 21 formed in the side walls of the body 1, said parts operating thereby to guide said gates in their vertical movement and also to retain said gates as well as the lifting nut 10 from rotation.

The closing disks 14 are formed on their inner surfaces with depressions 22 into which extend the projections 11 on the lifting nut 10, as shown in Figs. 1, 2 and 3.

In order to removably retain the packing 12 at the upper end of the lifting nut 10, I provide the latter with a flanged collar 23 adapted to be screwed onto the upper end of said lifting nut and to have its flange engage and retain the packing 12 in position.

In operation, when the parts are in the position shown in Fig. 1, the valve is fully opened for the passage of fluid, the gates 14 being elevated by the lifting nut 10, and the packing 12 at the upper end of said lifting nut forced in contact with the valve seat 13 in the bonnet 4, thereby forming a water tight closure, which, in conjunction with the integrally formed lifting nut 10 having its bottom closed, effectually prevents any leakage around the screw threads 8 and out through the top of the valve. When it is desired to close the valve, a rotation of the valve stem 6, by reason of the screw threads 8, will cause a bodily downward movement of said stem in the bonnet 4, carrying with it lifting nut 10, which lifting nut, by reason of the oppositely disposed screw threads 9, receives an additional downward movement, thus providing a quick acting valve. The gates 14, which in their upward movement, rest upon the projecting lugs 16 of the lifting nut, move downward with said nut, this action being a positive one, due to the contact of said lugs 16 with the bottoms of the recesses 17 in abutments 18, and one which forces said gates 14 positively to their seats. It will be observed in Fig. 1 that the depressions 22 on the gates 14 receiving rounded projections 11 are flat, thereby permitting vertical play of said projections 11 therein sufficient to cause projecting portions 16 to contact with the bottoms of the recesses 17 without any pressure from said projections on the gates 14, the sole function of said projections being to form pivots on which the gates may rock to provide for perfect seating in the event that the faces of the seats are not machined true. In opening or closing the valve gates 14 are prevented from rotation during their vertical movement by reason of the engagement of their lugs 20 in the grooves 21 of the body 1, and the lifting nut 10 also is positively held against rotation by the engagement of its projections 19 in said groove 20, whereby any binding of said disks by means of strain from the lifting nut in closing said disks effectually is prevented; it being apparent that all side strain or twisting effect which might occur were the lifting nut held against rotation by the disks alone in operating valve, is obviated.

Having thus described my invention, what I claim as new and desire to secure by Letters Patent, is:—

1. A gate valve, embodying a casing, a screw-threaded valve stem therein, closing disks, and a lifting nut supporting said disks and adapted to be raised and lowered by said stem, said lifting nut being closed at its lower end and when in its uppermost position being adapted to contact with a valve seat to seal said valve stem against leakage around its threads.

2. A gate valve, embodying a casing, a valve stem in screw-threaded engagement therewith and having its lower end oppositely screw-threaded, a lifting nut closed at its lower end and in screw-threaded engagement with said lower end of said stem, gates carried by said lifting nut, and a valve seat in said casing above said lifting nut against which a packing in the latter contacts when in its uppermost position to seal the valve against leakage around the valve stem.

3. A gate valve, embodying a casing, a valve stem therein, a lifting nut in screw-threaded engagement with said valve stem, gates carried by said lifting nut, and projections on said lifting nut and gates engaging common grooves in said casing for preventing rotation of said lifting nut and gates during rotation of said valve stem.

4. A gate valve embodying a casing, a valve stem therein, a lifting nut in screw-threaded engagement with said valve stem and formed with oppositely projecting lugs, and gates recessed in their backs to receive said lugs, the opposite surfaces of said recesses being in close relation to said lugs, whereby said gates will be supported and lifted by said lugs during upward movement of said nut, and will be forced to their seats by said lugs during downward movement of said nut.

5. A gate valve, embodying a casing, a valve stem therein, a lifting nut in screw-threaded engagement with said valve stem and formed with oppositely projecting lugs, and gates formed with recessed abutments receiving the lugs of said lifting nut, whereby said gates are loosely supported thereby, the abutments of said gates and the ends of the lugs on said lifting nut engaging common grooves in said casing for preventing rotation of said lifting nut and gates during rotation of said valve stem.

6. A gate valve, embodying a casing, a valve stem therein, a lifting nut in screw-threaded engagement with said valve stem and formed with oppositely projecting lugs having reduced outer ends, and gates formed with recessed abutments receiving the lugs of said lifting nut, whereby said gates are loosely supported thereby, the abutments of said gates and the reduced ends of the lugs on said lifting nut engaging common grooves in said casing for preventing rotation of said lifting nut and gates during rotation of said valve stem.

In testimony whereof I have hereunto set my hand in the presence of two subscribing witnesses.

WILLIAM C. MARSH.

Witnesses:
N. F. GOULD,
B. M. SULLIVAN.